United States Patent
Yamauchi et al.

(10) Patent No.: US 11,968,033 B2
(45) Date of Patent: Apr. 23, 2024

(54) OPTICAL TRANSMISSION DEVICE, OPTICAL TRANSMISSION SYSTEM, AND OPTICAL TRANSMITTING POWER CONTROL METHOD

(71) Applicant: FUJITSU LIMITED, Kawasaki (JP)

(72) Inventors: Tomohiro Yamauchi, Kawasaki (JP);
Takafumi Terahara, Kawasaki (JP);
Goji Nakagawa, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 91 days.

(21) Appl. No.: 17/875,766

(22) Filed: Jul. 28, 2022

(65) Prior Publication Data

US 2022/0368448 A1    Nov. 17, 2022

(30) Foreign Application Priority Data

Apr. 28, 2022   (JP) .................. 2022-074215

(51) Int. Cl.
*H04B 10/079*   (2013.01)
*H04J 14/02*    (2006.01)

(52) U.S. Cl.
CPC .... *H04J 14/0221* (2013.01); *H04B 10/07953* (2013.01); *H04B 10/07955* (2013.01); *H04B 10/0799* (2013.01)

(58) Field of Classification Search
CPC ........ H04B 10/07953; H04B 10/07955; H04B 10/0799; H04J 14/0221

(Continued)

(56) References Cited

U.S. PATENT DOCUMENTS

2006/0219878 A1   10/2006   Yano
2015/0304035 A1*  10/2015   Nijhof ................ H04J 14/0221
                                                         398/26

(Continued)

FOREIGN PATENT DOCUMENTS

JP    2006-287649    10/2006
JP    2012-124686     6/2012

OTHER PUBLICATIONS

He et al: Design of Submarine "Open" cables, OFC 2018, paper M1D4, (2018) (Year: 2018).*

(Continued)

*Primary Examiner* — Li Liu
(74) *Attorney, Agent, or Firm* — STAAS & HALSEY LLP

(57) ABSTRACT

Optical transmission system transmits WDM signal from first node to second node via optical fiber. The optical transmission system includes: first OCM that detects optical power of each wavelength channel of the WDM signal in the first node; second OCM that detects optical power of each wavelength channel of the WDM signal in the second node; first processor that calculates linear SNR of each wavelength channel based on the optical power of each wavelength channel detected by the second OCM; second processor that calculates non-linear SNR of each wavelength channel based on the optical power of each wavelength channel detected by the first OCM; third processor that calculates GSNR for each wavelength channel using the linear SNR and the non-linear SNR; and fourth processor that controls transmission power of each wavelength channel of the WDM signal based on the GSNR of each wavelength channel.

9 Claims, 15 Drawing Sheets

(58) Field of Classification Search
USPC ............ 398/25, 26, 34, 38, 79, 94, 162, 197
See application file for complete search history.

(56) References Cited

U.S. PATENT DOCUMENTS

| | | | |
|---|---|---|---|
| 2019/0215073 A1* | 7/2019 | Schmogrow | H04J 14/0271 |
| 2021/0126732 A1* | 4/2021 | Marenco | H04B 10/07953 |
| 2021/0273722 A1* | 9/2021 | He | H04B 10/0731 |
| 2022/0109509 A1* | 4/2022 | Tibuleac | H04B 10/2935 |
| 2022/0407608 A1* | 12/2022 | Crognale | H04B 10/6932 |

OTHER PUBLICATIONS

Poggliolini, P., "Analytical Modeling of Non-Linear Propagation in Coherent Systems," in Proc. OFC 2013, Anaheim, CA, Mar. 2013 (132 pp.).

* cited by examiner

OPTICAL TRANSMISSION DEVICE, OPTICAL TRANSMISSION SYSTEM, AND OPTICAL TRANSMITTING POWER CONTROL METHOD

CROSS-REFERENCE TO RELATED APPLICATION

This application is based upon and claims the benefit of priority of the prior Japanese Patent Application No. 2022-074215, filed on Apr. 28, 2022, the entire contents of which are incorporated herein by reference.

FIELD

The embodiments discussed herein are related to an optical transmission device, an optical transmission system, and an optical transmitting power control method.

BACKGROUND

Wavelength division multiplexing (WDM) has been put into practical use to provide large-capacity optical communication. The WDM transmits a signal by using a plurality of wavelength channels. Therefore, by multiplexing a large number of wavelength channels, large-capacity optical communication is achieved.

However, the transmission performance of a WDM signal depends on the wavelength. Therefore, pre-emphasis (or pre-equalization) may be performed in a WDM transmission system. For example, a reception node monitors optical power or optical signal-to-noise ratio (OSNR) of each wavelength channel. Then, a transmission node controls transmission power of each wavelength channel so that the optical powers or the OSNRs of the wavelength channels monitored in the reception node are equalized. As a result, variations in transmission performance of each wavelength channel are suppressed.

Note that an apparatus and a method for adjusting transmission power of an optical signal in an optical transmission system have been proposed (for example, Japanese Laid-Open Patent Publication No. 2006-287649). A method for specifying a reflection point (failure portion) in a wavelength multiplexing transmission system has been proposed (for example, Japanese Laid-Open Patent Publication No. 2012-124686).

In recent years, a bandwidth of a WDM transmission system has been expanded. For example, conventionally, signals are transmitted using only the C band, but nowadays, a WDM transmission system that simultaneously uses the C band and the L band to transmit signals have been proposed. For this reason, existing pre-emphasis may not sufficiently suppress variations in transmission performance of each wavelength channel.

SUMMARY

According to an aspect of the embodiments, an optical transmission system transmits a WDM (wavelength division multiplexed) signal from a first optical transmission device to a second optical transmission device via an optical fiber transmission line. The optical transmission system includes: a first optical channel monitor that detects optical power of each wavelength channel of the WDM signal in the first optical transmission device; a second optical channel monitor that detects optical power of each wavelength channel of the WDM signal in the second optical transmission device; a first processor that calculates a linear SNR (signal-to-noise ratio) of each wavelength channel of the WDM signal based on the optical power of each wavelength channel detected by the second optical channel monitor; a second processor that calculates a non-linear SNR of each wavelength channel of the WDM signal based on the optical power of each wavelength channel detected by the first optical channel monitor; a third processor that calculates a GSNR (generalized SNR) for each wavelength channel of the WDM signal using the linear SNR calculated by the first processor and the non-linear SNR calculated by the second processor; and a fourth processor that controls transmission power of each wavelength channel of the WDM signal transmitted from the first optical transmission device based on the GSNR of each wavelength channel calculated by the third processor.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
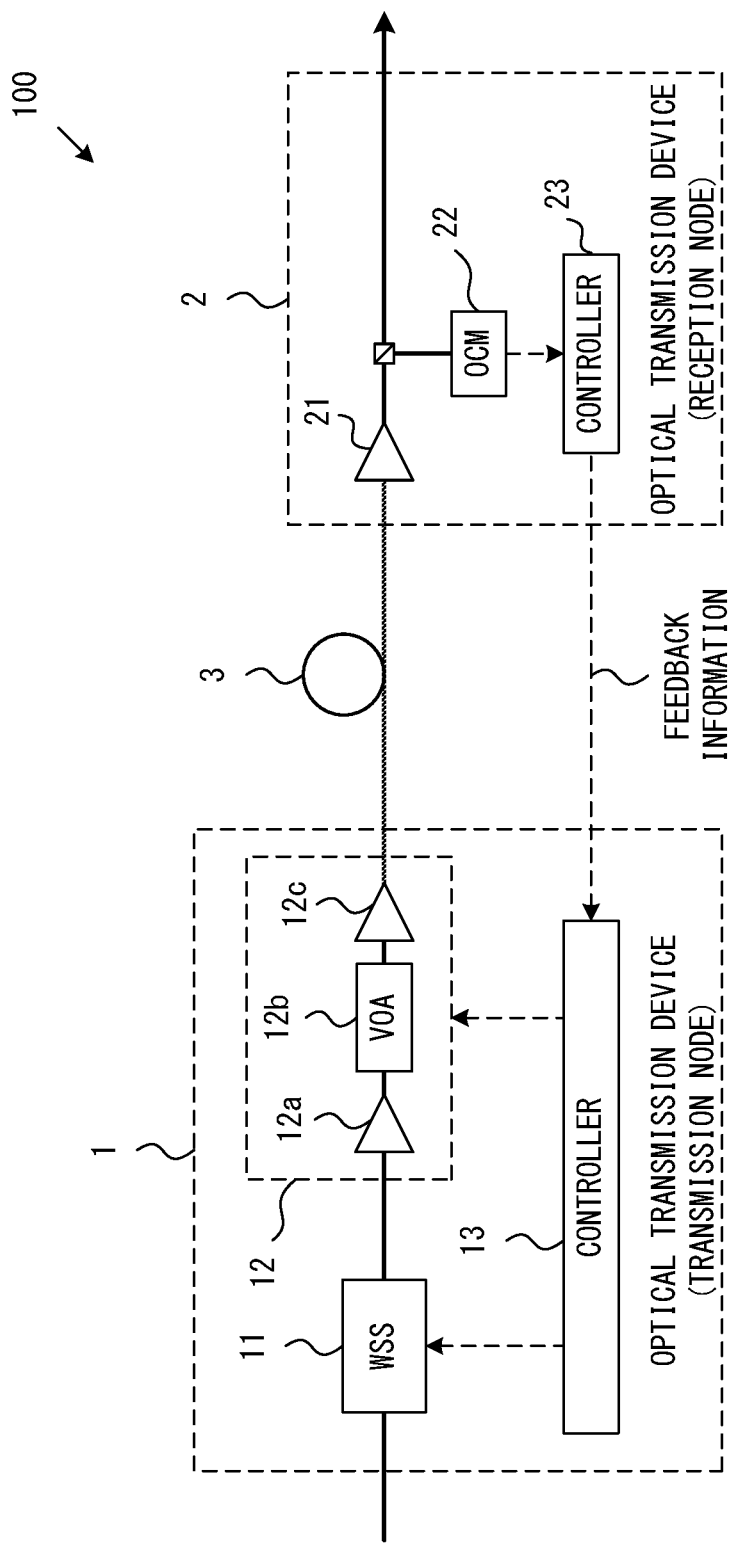
FIG. 1 illustrates an example of an optical transmission system according to an embodiment of the present invention.

FIG. 1 illustrates an example of an optical transmission system according to an embodiment of the present invention. An optical transmission system 100 according to an embodiment of the present invention includes an optical transmission device 1 and an optical transmission device 2. An optical fiber transmission line 3 connects the optical transmission device 1 and the optical transmission device 2. In FIG. 1, an optical signal is transmitted from the optical transmission device 1 to the optical transmission device 2, but an optical signal can also be transmitted from the optical transmission device 2 to the optical transmission device 1. That is, in FIG. 1, an optical reception circuit of the optical transmission device 1 is omitted, and an optical transmission circuit of the optical transmission device 2 is omitted.

The optical transmission system 100 transmits a WDM signal. That is, a WDM signal generated by the optical transmission device 1 is transmitted via the optical fiber transmission line 3. Then, the optical transmission device 2 receives the WDM signal. In this example, the WDM signal includes a C-band optical signal and an L-band optical signal.

The optical transmission device 1 includes a wavelength selective switch (WSS) 11, an optical amplifier circuit 12, and a controller 13. Note that the optical transmission device 1 may include other elements, circuits, or functions not illustrated in FIG. 1.

The WSS 11 adjusts optical power of each wavelength channel of the WDM signal in accordance with an instruction given from the controller 13. Note that the WSS 11 is an example of an optical circuit that controls optical power of each wavelength channel of the WDM signal in accordance with an instruction given from the controller 13. That is, the optical transmission device 1 may use an optical circuit of another form that controls the optical power of each wavelength channel of the WDM signal instead of the WSS 11.

The optical amplifier circuit 12 amplifies the WDM signal in accordance with an instruction given from the controller 13. In this example, the optical amplifier circuit 12 includes an optical amplifier 12*a*, a variable optical attenuator (VOA) 12*b*, and an optical amplifier 12*c*. The optical amplifier 12*a* amplifies the WDM signal output from the WSS 11. The VOA 12*b* attenuates the WDM signal output from the optical amplifier 12*a*. The optical amplifier 12*c* amplifies the WDM signal output from the VOA 12*b*.

The optical amplifier circuit 12 performs Automatic Gain Control (AGC) for making the gain between the input of the optical amplifier 12*a* and the output of the optical amplifier 12*c* constant. Here, it is possible to tilt the gain of the optical amplifier circuit 12 with respect to the wavelength by changing an attenuation amount of the VOA 12*b*. Specifically, when the attenuation amount of the VOA 12*b* is increased, the sum of the gains of the optical amplifier 12*a* and the optical amplifier 12*c* increases by the same amount as the increased loss of the VOA. The optical amplifiers 12*a* and 12*c* are amplification media doped with rare earth such as EDF, and when the gain is increased, short-wavelength upward tilt occurs in which the short-wavelength side becomes higher. As a result, short-wavelength upward tilt can be generated in the output of the optical amplifier circuit 12. Conversely, when the attenuation amount of the VOA 12*b* is decreased, a tilt in the opposite direction occurs.

The controller 13 controls the WSS 11 and the optical amplifier circuit 12 based on feedback information received from the optical transmission device 2. In the example illustrated in FIG. 1, the optical amplifier circuit 12 is provided on the output side of the WSS 11, but the optical amplifier circuit 12 may be provided on the input side of the WSS 11.

The optical transmission device 2 includes an optical amplifier 21, an optical channel monitor (OCM) 22, and a controller 23. Note that the optical transmission device 2 may include other elements, circuits, or functions not illustrated in FIG. 1.

The optical amplifier 21 amplifies the WDM signal received via the optical fiber transmission line 3. The OCM 22 monitors optical power of each wavelength channel of the received WDM signal. The controller 23 generates feedback information based on the output signal of the OCM 22. The feedback information may indicate optical power of each wavelength channel of the received WDM signal. Alternatively, the feedback information may indicate an OSNR of each wavelength channel of the received WDM signal. The feedback information is transmitted from the optical transmission device 2 to the optical transmission device 1 using, for example, an optical supervisory channel (OSC). In this case, an OSC optical transmitter of the optical transmission device 2 transmits an optical signal indicating the feedback information from the optical transmission device 2 to the optical transmission device 1 via an optical fiber that propagates light. Then, an OSC optical receiver of the optical transmission device 1 acquires the feedback information by receiving the optical signal.

In the optical transmission system 100, the quality of each wavelength channel received by the optical transmission device 2 is represented by, for example, OSNR. However, in a case where the bandwidth of the WDM signal is wide, it is preferable to consider non-linear noise generated in the optical fiber transmission line 3. That is, the quality of the optical signal is preferably represented by GSNR (Generalized SNR). Here, the GSNR is expressed by Formula (1).

$$\frac{1}{GSNR} = \frac{1}{SNR\_L} + \frac{1}{SNR\_NL} \qquad (1)$$

SNR_L represents a ratio between an optical signal and linear noise, and can be calculated from the OSNR. SNR_NL represents a ratio between an optical signal and non-linear noise.

Figure 2A:
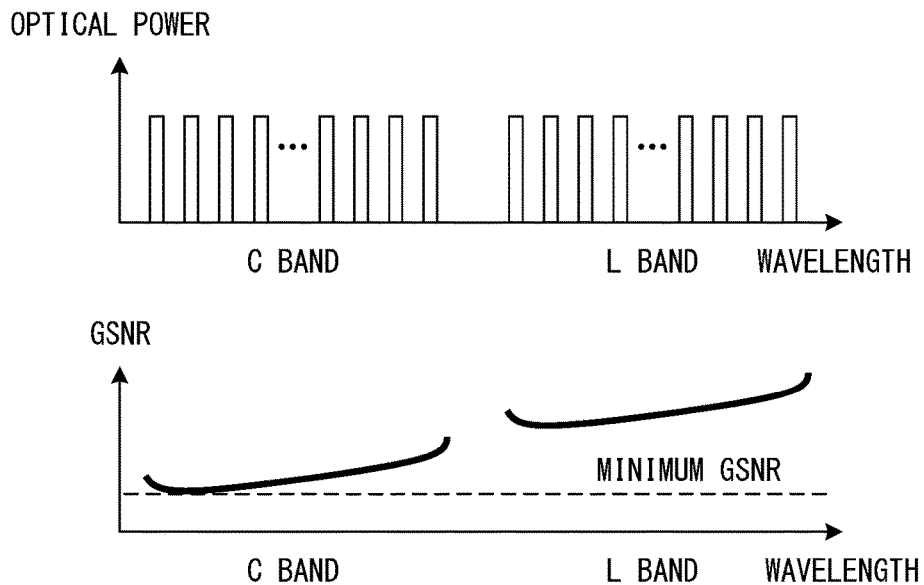
FIGS. 2A and 2B illustrate an example of a GSNR in a reception node.
Figure 2B:
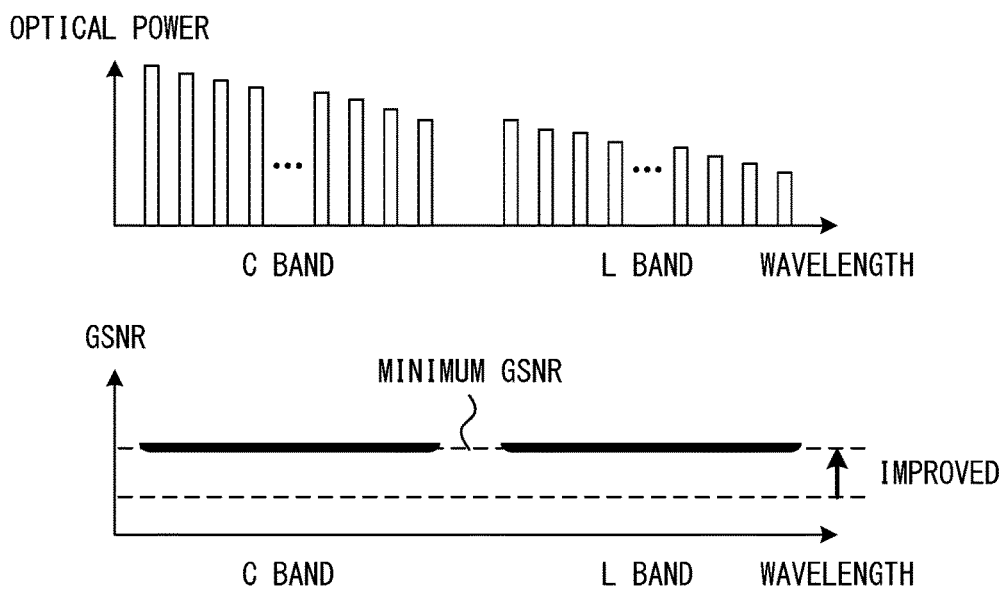

FIGS. 2A and 2B illustrate an example of a GSNR in a reception node. In the example illustrated in FIG. 2A, the optical power of each wavelength channel of the WDM signal transmitted from the transmission node (in FIG. 1, optical transmission device 1) is constant. However, when the WDM signal propagates through the optical fiber transmission line 3, linear noise and non-linear noise are generated. Therefore, at the reception node (in FIG. 1, optical transmission device 2), the GSNR is not flat with respect to the wavelength. In the example illustrated in FIG. 2A, the GSNR is the smaller in the short wavelength region in the C band. Here, an error is likely to occur in a wavelength channel having the smaller GSNR. Therefore, it is important to increase the minimum GSNR.

As described above, the optical transmission device 1 controls the optical transmitting power of each wavelength channel of the WDM signal based on the feedback information generated by the optical transmission device 2. At this time, the optical transmission device 1 preferably controls the optical power of each wavelength channel of the WDM signal so as to increase the minimum GSNR at the reception node. For example, as illustrated in FIG. 2B, the optical transmission device 1 controls the optical power of each wavelength channel of the WDM signal so that the GSNR becomes flat with respect to the wavelength. By doing this, the minimum GSNR is increased and the quality of the WDM signal is improved.

Figure 3A:
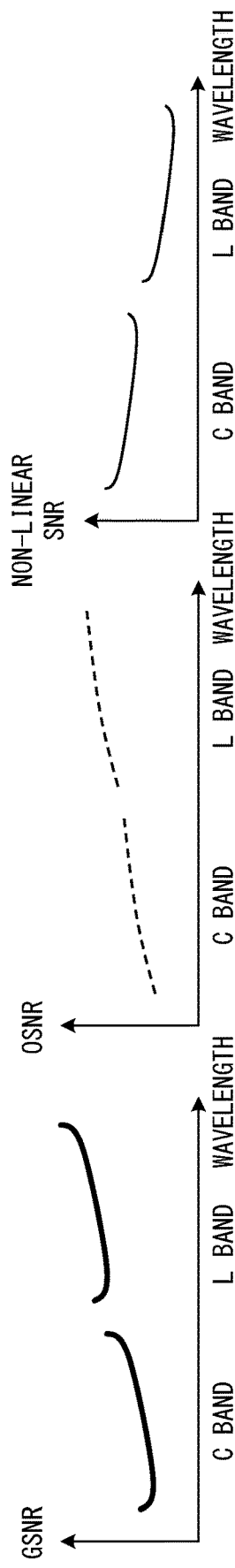
FIGS. 3A and 3B illustrate a relationship among OSNR, non-linear SNR, and GSNR.
Figure 3B:
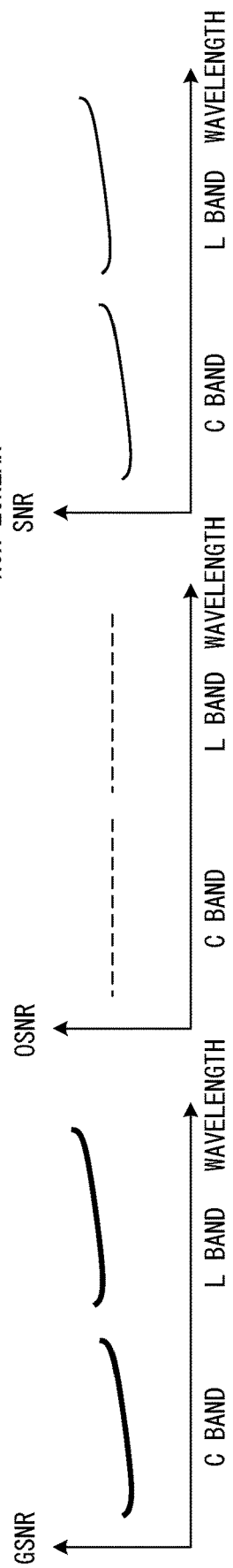

FIGS. 3A and 3B are diagrams for explaining a relationship among an OSNR, a non-linear SNR, and a GSNR. Here, FIG. 3A illustrates characteristics when the optical power of each wavelength channel of the WDM signal (in FIG. 1, WDM signal transmitted from the optical transmission device 1) input to the optical fiber is flat with respect to the wavelength. In the optical fiber transmission line, a part of the optical power of a channel in the short wavelength region is absorbed by a channel in the long wavelength region due to stimulated Raman scattering (SRS). Therefore, the optical power of the wavelength channel in the short wavelength region decreases, and the OSNR in the short wavelength region decreases. On the other hand, the higher the optical power, the larger the non-linear noise. Therefore, when the optical power of the wavelength channel in the long wavelength region increases due to the SRS, the non-linear noise increases, and thus, the non-linear SNR in the long wavelength region deteriorates.

For this problem, the transmission node may control the transmission power of each wavelength channel so that the OSNR of each wavelength channel at the reception node is flat with respect to the wavelength. That is, by pre-emphasis, the OSNR at the reception node can be made flat with respect to the wavelength. However, in this case, since pre-emphasis for increasing the transmission power in the short wavelength region is performed, the non-linear SNR of the wavelength channel in the short wavelength region decreases as illustrated in FIG. 3B. Here, the GSNR depends on both the OSNR and the non-linear SNR as expressed by Formula (1). Therefore, simply making the OSNR flat with respect to the wavelength may not make the GSNR flat with respect to the wavelength.

Therefore, the transmission power control method according to the embodiment of the present invention calculates a GSNR of each wavelength channel. Then, the transmission power of each wavelength channel is controlled such that the GSNR of each wavelength channel is flat or substantially flat with respect to the wavelength. As a result, as illustrated in FIG. 2B, the GSNR of each wavelength channel becomes flat with respect to the wavelength at the reception node. By doing this, the minimum GSNR is improved and the quality of the WDM signal is improved.

First Embodiment

Figure 4:
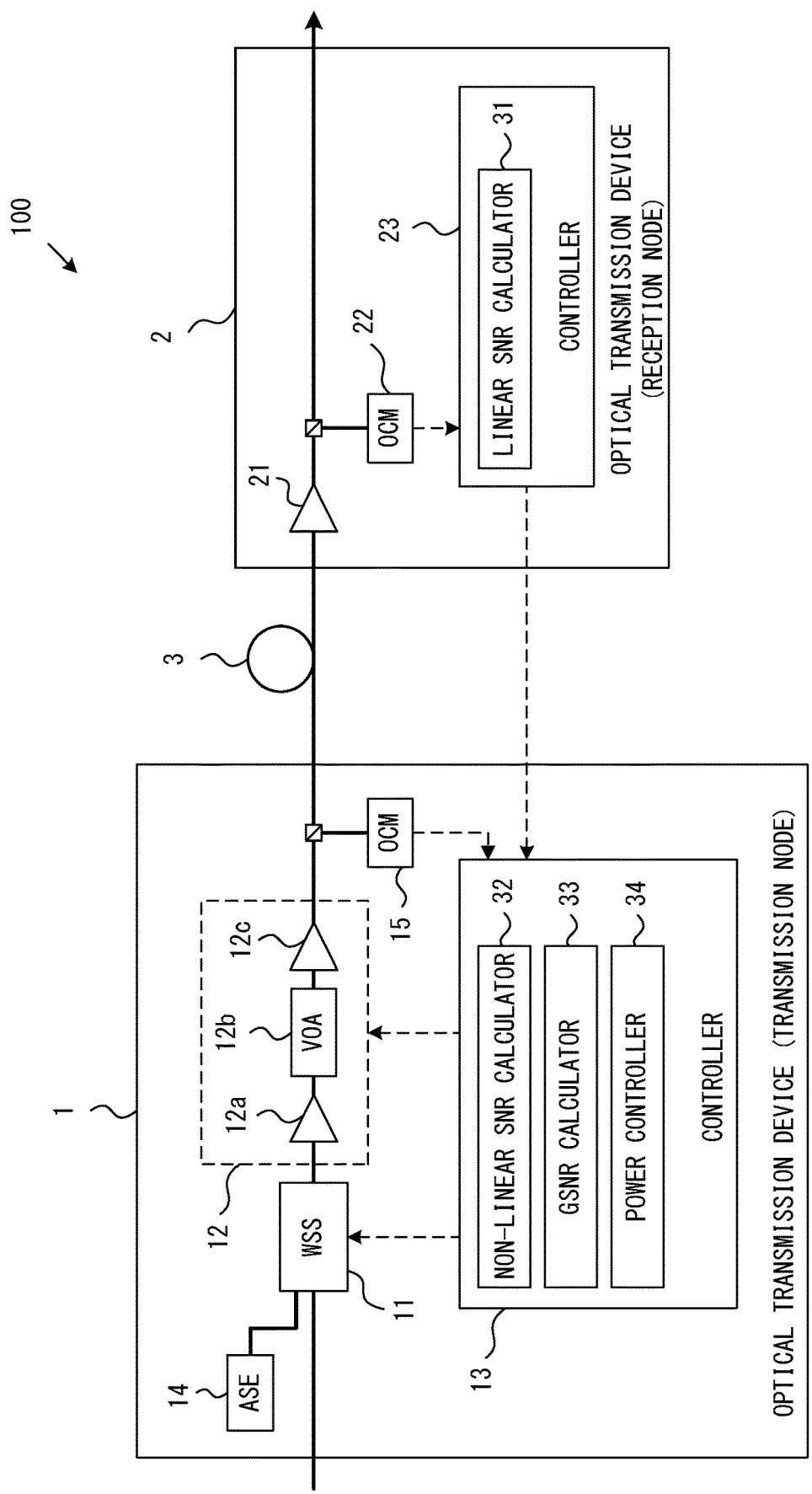
FIG. 4 illustrates an example of an optical transmission system according to a first embodiment of the present invention.

FIG. 4 illustrates an example of an optical transmission system according to a first embodiment of the present invention. In the first embodiment, the optical transmission device 1 may include an amplified spontaneous emission (ASE) light source 14 in addition to the WSS 11, the optical amplifier circuit 12, and the controller 13 described with reference to FIG. 1. The ASE light source 14 generates ASE light. Here, it is assumed that the ASE light source 14 can generate high-power and broadband ASE light. The ASE light generated by the ASE light source 14 is guided to the WSS 11. The WSS 11 can use the ASE light to generate one or more pseudo optical signals transmitted through one or more desired wavelength channels.

When the characteristics of the WDM signal are monitored, it is preferable that the total optical power of the WDM signal is maintained at a specified level. Therefore, when the number of optical signals multiplexed in the WDM signal is small, the total optical power of the WDM signal may be maintained at a specified level by inserting one or more pseudo optical signals generated using the ASE light into the WDM signal.

In addition, the optical transmission device 1 includes an OCM 15. The OCM 15 monitors the optical power of each wavelength channel of the WDM signal output from the optical transmission device 1 to the optical fiber transmission line 3. The monitoring result of the OCM 15 is notified to the controller 13.

In the reception node (that is, optical transmission device 2), the controller 23 includes a linear SNR calculator 31. The linear SNR calculator 31 calculates a linear SNR of each wavelength channel of the WDM signal using the output signal of the OCM 22. Here, the linear SNR is not strictly the same as the OSNR, but is assumed to be equivalent to the OSNR in this example.

Figure 5A:
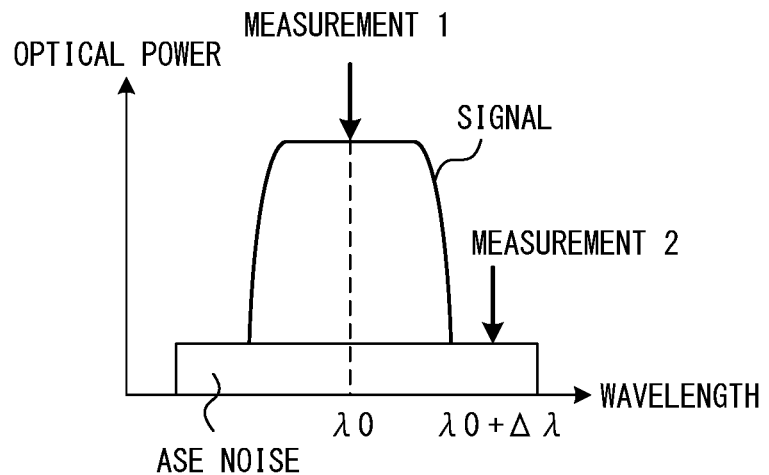
FIGS. 5A and 5B illustrate an example of a method for calculating a linear SNR of a wavelength channel.
Figure 5B:
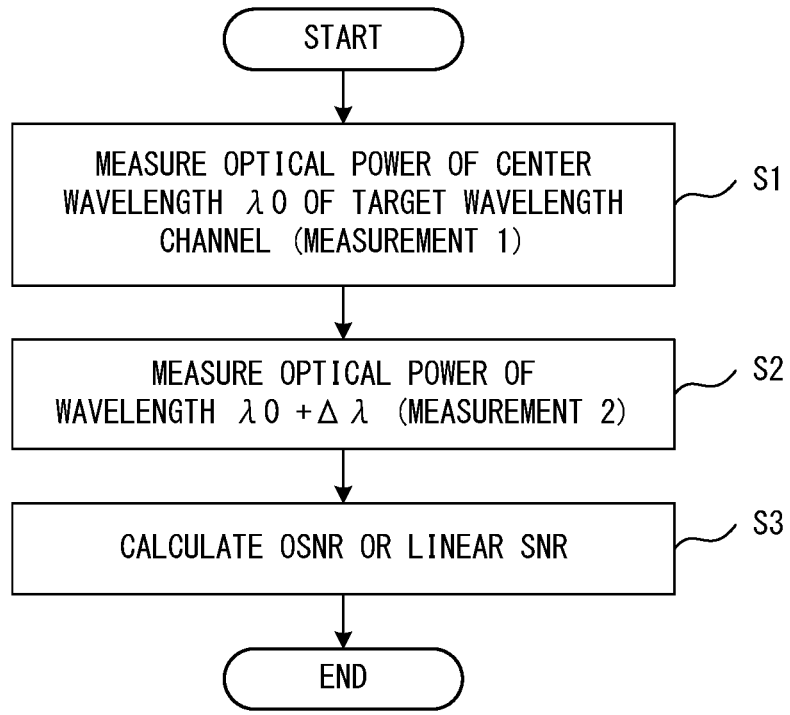

FIGS. 5A and 5B illustrate an example of a method for calculating a linear SNR of a wavelength channel. When calculating the linear SNR of the wavelength channel, the optical transmission device 1 transmits a WDM signal to the optical transmission device 2. At this time, a pseudo optical signal generated using the ASE light source 14 is preferably inserted into a wavelength channel that does not transmit a signal.

In the optical transmission device 2, the OCM 22 monitors the optical power of the WDM signal. That is, the spectrum of the WDM signal received by the optical transmission device 2 is detected. Then, the linear SNR calculator 31 calculates a linear SNR of each wavelength channel using the output signal of the OCM 22. Specifically, as illustrated in FIG. 5A, the linear SNR calculator 31 detects the optical power of the center wavelength $\lambda 0$ of the wavelength channel (measurement 1). In addition, the linear SNR calculator 31 detects the optical power of the wavelength shifted by $\Delta\lambda$ from the wavelength $\lambda 0$ (measurement 2). Note that $\lambda 0+\Delta\lambda$ is a wavelength at which a signal component is sufficiently small. Therefore, the optical power detected at $\lambda 0+\Delta\lambda$ corresponds to the power of an ASE noise. Therefore, the linear SNR calculator 31 can calculate the linear SNR by the procedure illustrated in FIG. 5B.

In S1, the linear SNR calculator 31 detects the optical power of the center wavelength $\lambda 0$ of the wavelength channel. As a result, an optical power P_ch of the signal is obtained. In S2, the linear SNR calculator 31 detects optical power of a wavelength shifted by $\Delta\lambda$ from the wavelength $\lambda 0$. As a result, an optical power P_ASE of the ASE noise is obtained. Then, in S3, the linear SNR calculator 31 calculates a linear SNR from the optical power P_ch of the signal obtained in S1 and the optical power P_ASE of the ASE noise obtained in S2. The linear SNR (SNR_L) is expressed by Formula (2).

$$SNR\_L = P\_CH/P\_ASE \qquad (2)$$

According to the method illustrated in FIGS. 5A and 5B, it is possible to calculate a linear SNR while transmitting a signal. However, in a case where a spacing between the wavelength channels of the WDM signal is narrow, it is difficult to accurately measure the optical power of the ASE noise.

Figure 6A:
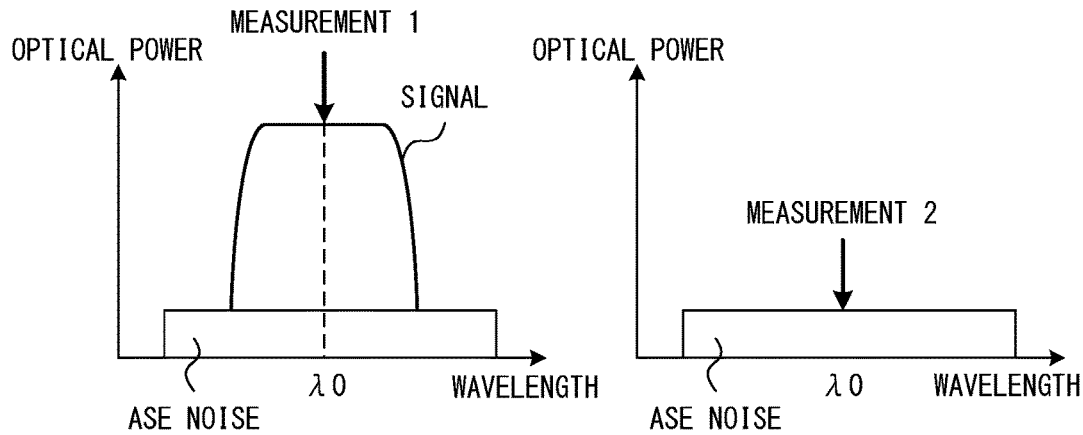
FIGS. 6A and 6B illustrate another example of a method for calculating a linear SNR of a wavelength channel.
Figure 6B:
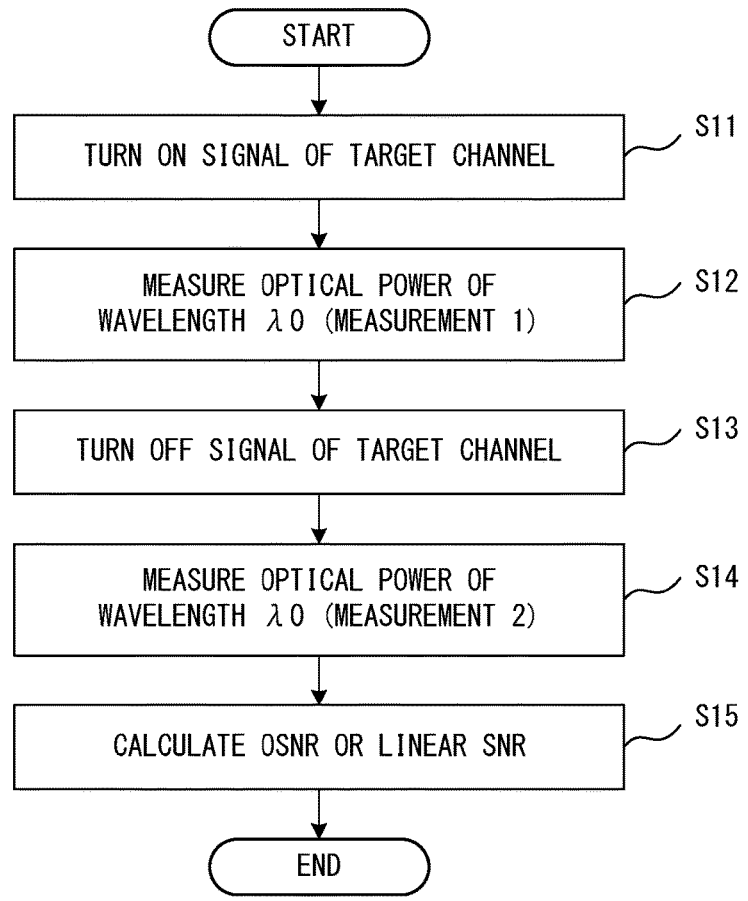

FIGS. 6A and 6B illustrate another example of a method of calculating a linear SNR of a wavelength channel. In this method, as illustrated in FIG. 6A, the optical power of the center wavelength $\lambda 0$ of the wavelength channel is detected in a state where a signal is transmitted (measurement 1). In addition, the optical power of the wavelength $\lambda 0$ is detected in a state where the signal is stopped (measurement 2).

Specifically, the linear SNR calculator 31 can calculate the linear SNR by the procedure illustrated in FIG. 6B.

In S11, the transmission node transmits a signal via the wavelength channel to be measured. In S12, the linear SNR calculator 31 provided in the reception node detects the optical power of the center wavelength λ0 of the wavelength channel. As a result, an optical power P_ch of the signal is obtained. In S13, the transmission node stops the wavelength channel to be measured by controlling the WSS 11. In S14, the linear SNR calculator 31 detects the optical power of the wavelength λ0. As a result, an optical power P_ASE of the ASE noise is obtained. Then, in S15, the linear SNR calculator 31 calculates a linear SNR from the optical power P_ch of the signal obtained in S12 and the optical power P_ASE of the ASE noise obtained in S14. The linear SNR is expressed by Formula (2) similarly to the method illustrated in FIGS. 5A and 5B.

The linear SNR calculator 31 calculates a linear SNR of each wavelength channel by the method illustrated in FIG. 5A or FIG. 6A. Then, the optical transmission device 2 transmits information indicating the linear SNR calculated by the linear SNR calculator 31 to the optical transmission device 1 as feedback information. In addition, the optical transmission device 2 may transmit information indicating the optical power of each wavelength channel detected by the OCM 22 to the optical transmission device 1 as feedback information.

The controller 13 provided in the optical transmission device 1 includes a non-linear SNR calculator 32, a GSNR calculator 33, and a power controller 34. Furthermore, although not illustrated, the controller 13 includes an acquisition unit (alternatively, reception unit) that acquires information indicating the linear SNR calculated in the optical transmission device 2. The controller 13 calculates the GSNR based on the feedback information received from the optical transmission device 2, and controls the optical transmitting power of each wavelength channel of the WDM signal so as to make the GSNR flat with respect to the wavelength or to increase the minimum GSNR.

The non-linear SNR calculator 32 calculates a non-linear SNR of each wavelength channel based on the optical power detected by the OCM 15. Here, the intensity of the non-linear noise is proportional to the cube of the power of the light input to the optical fiber transmission line 3. That is, the non-linear noise P_NLI is expressed by Formula (3).

$$P\_NLI = \eta (P\_CH(T))^3 \quad (3)$$

"η" represents a proportionality coefficient for calculating the non-linear SNR. Further, "T" indicates the optical transmission device 1 (transmission node), and "P_CH(T)" indicates transmission line input power of the wavelength channel to be measured output from the optical transmission device 1 (transmission node). Note that this relationship is described in, for example, P. Poggiolini, Analytical modeling of non-linear propagation in coherent systems, in Proc. OFC 2013, Anaheim, CA, March 2013.

Here, when the bandwidth of the wavelength channel is constant, the non-linear noise per unit bandwidth (for example, 12.5 GHz) is expressed by Formula (4).

$$G\_NLI = nd(P\_CH(T)/B\_CH)^3 \quad (4)$$

"ηd" represents a proportionality coefficient. "B_CH" represents the bandwidth of the wavelength channel.

Therefore, the non-linear SNR is expressed by Formula (5).

$$SNR\_NL = \frac{P\_CH(T)/B\_CH}{G\_NLI} = \frac{1}{\eta d (P\_CH(T)/B\_CH)^2} \quad (5)$$

Here, the proportionality coefficient ηd is assumed to be a known value determined by the type or the like of fiber of the transmission line. In addition, the bandwidth of the wavelength channel is known. Therefore, when the optical power P_CH(T) of the wavelength channel is detected using the OCM 15, the non-linear SNR is calculated. Note that "P_CH(T)/B_CH" corresponds to the optical fiber input power per unit bandwidth.

The GSNR calculator 33 calculates the GSNR based on the linear SNR notified from the reception node (that is, optical transmission device 2) and the non-linear SNR calculated by the non-linear SNR calculator 32. In this example, the GSNR is calculated by Formula (6).

$$\frac{1}{GSNR} = \frac{1}{SNR\_L} + \frac{1}{SNR\_NL} \quad (6)$$

Figure 7:
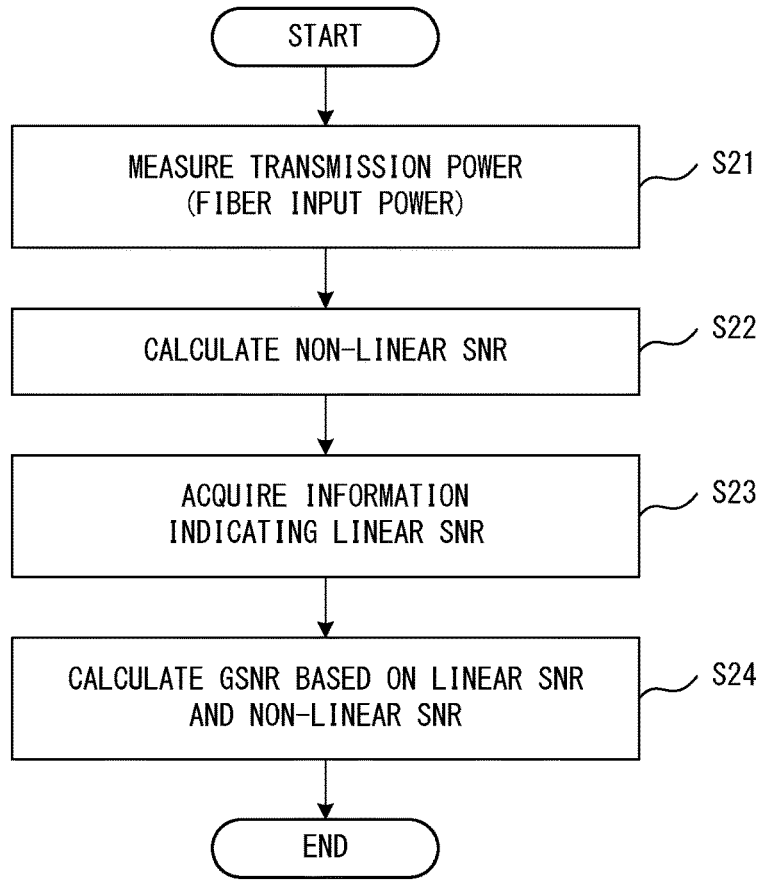
FIG. 7 is a flowchart illustrating an example of a process for calculating a GSNR.

FIG. 7 is a flowchart illustrating an example of a process for calculating GSNR. The process of this flowchart is executed by the controller 13 of the transmission node (that is, optical transmission device 1) in this example.

In S21, the non-linear SNR calculator 32 measures the optical power of the center wavelength of the target wavelength channel using the OCM 15. That is, optical transmitting power (or fiber input power) is measured. In S22, the non-linear SNR calculator 32 calculates the non-linear SNR of the target wavelength channel based on the optical power measured in S21. The non-linear SNR is calculated by, for example, Formula (5) described above. Note that it is assumed that the coefficient rid and the bandwidth of the wavelength channel are given.

In S23, the GSNR calculator 33 acquires information indicating the linear SNR of the target wavelength channel. Information indicating the linear SNR is generated at the reception node as feedback information. In S24, the GSNR calculator 33 calculates the GSNR based on the non-linear SNR calculated in S22 and the linear SNR acquired in S23. The GSNR is calculated by Formula (6). Note that the controller 13 calculates a GSNR for each wavelength channel of the WDM signal.

The power controller 34 controls optical transmitting power of each wavelength channel of the WDM signal based on the GSNR of each wavelength channel calculated by the GSNR calculator 33 in the optical transmission device 1. Specifically, for example, the power controller 34 may control the optical transmitting power of each wavelength channel of the WDM signal so as to reduce the variation in the GSNR of each wavelength channel or increase the minimum GSNR. At this time, the power controller 34 controls the attenuation amount for each wavelength channel in the WSS 11 and controls the attenuation amount of the VOA 12*b* in the optical amplifier circuit 12.

Here, the target value TP_CH(i) of the optical transmitting power (that is, fiber input power) of the wavelength channel i is updated by Formula (7).

$$TP\_CH(i) = P\_CH(i) + \Delta P\_CH(i) \quad (7)$$

P_CH(i) represents the fiber input power of the wavelength channel i before the update. ΔP_CH(i) represents an adjustment value for the target value of the wavelength channel i.

The adjustment value for the target value of the fiber input power of the wavelength channel i is determined based on the GSNR of the wavelength channel i and the average value of the GSNR, for example, as indicated in Formula (8).

$$\Delta P\_CH(i)=f1(GSNR(i),\overline{GSNR}) \qquad (8)$$

GSNR(i) represents the GSNR of the wavelength channel i. Then, the function f1 is achieved by, for example, a calculation formula that makes the GSNR of the wavelength channel i close to the average value of the GSNR.

Alternatively, the adjustment value for the target value of the fiber input power of the wavelength channel i may be determined based on the linear SNR of the wavelength channel i, the average value of the linear SNR, the non-linear SNR of the wavelength channel i, and the average value of the non-linear SNR as expressed in Formula (9).

$$\Delta P\_CH(i)=f2(SNR\_L(i),\overline{SNR\_L},SNR\_NL(i),\overline{SNR\_NL}) \qquad (9)$$

SNR_L(i) represents a linear SNR of the wavelength channel i, and SNR_NL(i) represents a non-linear SNR of the wavelength channel i. Then, the function f2 is achieved by, for example, a calculation formula that makes the linear SNR of the wavelength channel i close to the average value of the linear SNR and makes the non-linear SNR of the wavelength channel i close to the average value of the non-linear SNR.

For example, when attempting to compensate for the wavelength characteristic of the adjustment value ΔP_CH(i) of the target value of the wavelength channel i by the tilt of the output of the optical amplifier circuit 12, the power controller 34 calculates the change amount ΔVOA of the VOA 12b in the optical amplifier circuit 12 closest to the wavelength characteristic of ΔP_CH(i), and changes the attenuation amount of the VOA 12b by this amount. Then, the remaining components that cannot be compensated for by the tilt of the gain are compensated for by changing the attenuation amount of each channel of the WSS 11. As a result, a change in the wavelength characteristic of ΔP_CH (i) is achieved. Note that, as illustrated in FIG. 1 or 4, the optical amplifier circuit 12 includes an optical amplifier 12a, a VOA 12b, and an optical amplifier 12c.

Figure 8:
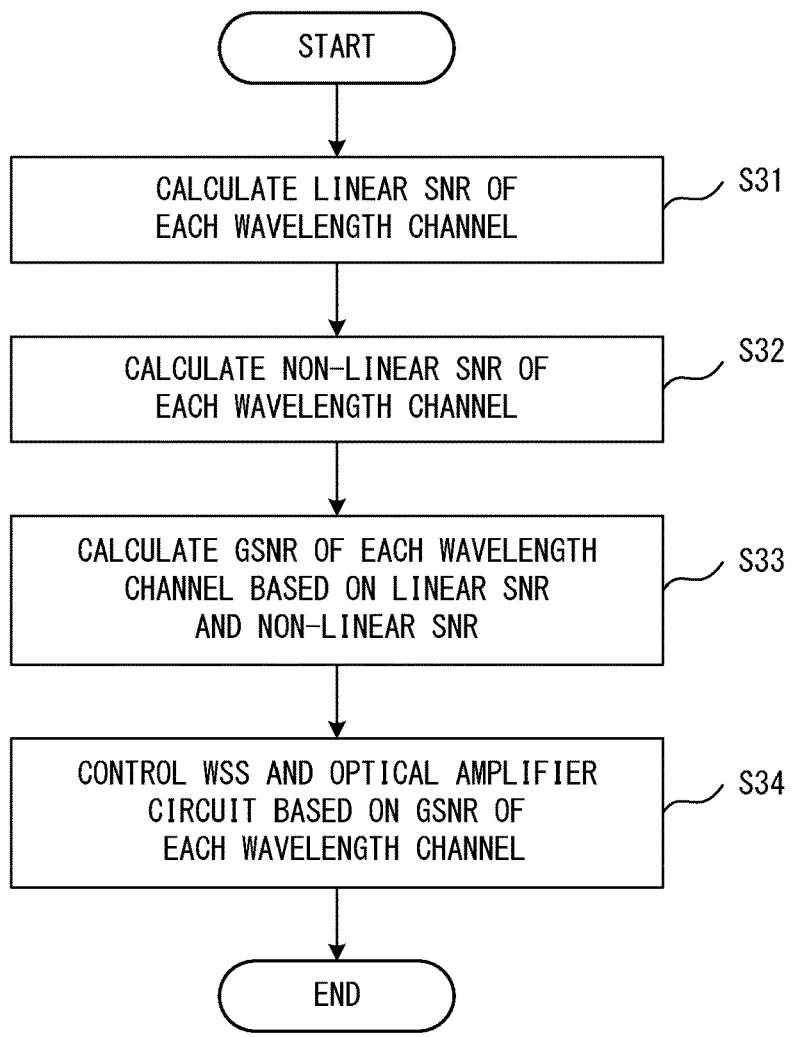
FIG. 8 is a flowchart illustrating an example of a method for controlling transmission power of each wavelength channel.

FIG. 8 is a flowchart illustrating an example of a method for controlling transmission power of each wavelength channel. The process of this flowchart is executed periodically, for example. Alternatively, the process of this flowchart may be executed in response to an instruction from the network administrator.

In S31, the controller 23 provided in the reception node calculates a linear SNR of each wavelength channel. In S32, the controller 13 provided in the transmission node calculates a non-linear SNR of each wavelength channel. In step S33, the controller 13 calculates the GSNR of each wavelength channel based on the linear SNR obtained in step S31 and the non-linear SNR obtained in step S32. In S34, the controller 13 controls the WSS 11 and the optical amplifier circuit 12 provided on the transmission node based on the GSNR of each wavelength channel. By the above-described transmission power control, as illustrated in FIG. 2B, the variation in the GSNR of each wavelength channel is reduced. As a result, the minimum GSNR is increased, and the quality of the WDM signal is improved.

Note that, in the example illustrated in FIG. 4, a linear SNR is calculated at a reception node (that is, optical transmission device 2), and feedback information indicating the linear SNR is notified to a transmission node (that is, optical transmission device 1). However, the embodiment of the present invention is not limited to this configuration. For example, the optical transmission device 2 may transmit spectrum information detected by the OCM 22 to the optical transmission device 1. This spectrum information indicates the spectrum of the WDM signal received by the optical transmission device 2. In this case, the linear SNR calculator 31 illustrated in FIG. 4 is provided in the controller 13 of the optical transmission device 1, and calculates a linear SNR of each wavelength channel using the spectrum information received from the optical transmission device 2.

Figure 9:
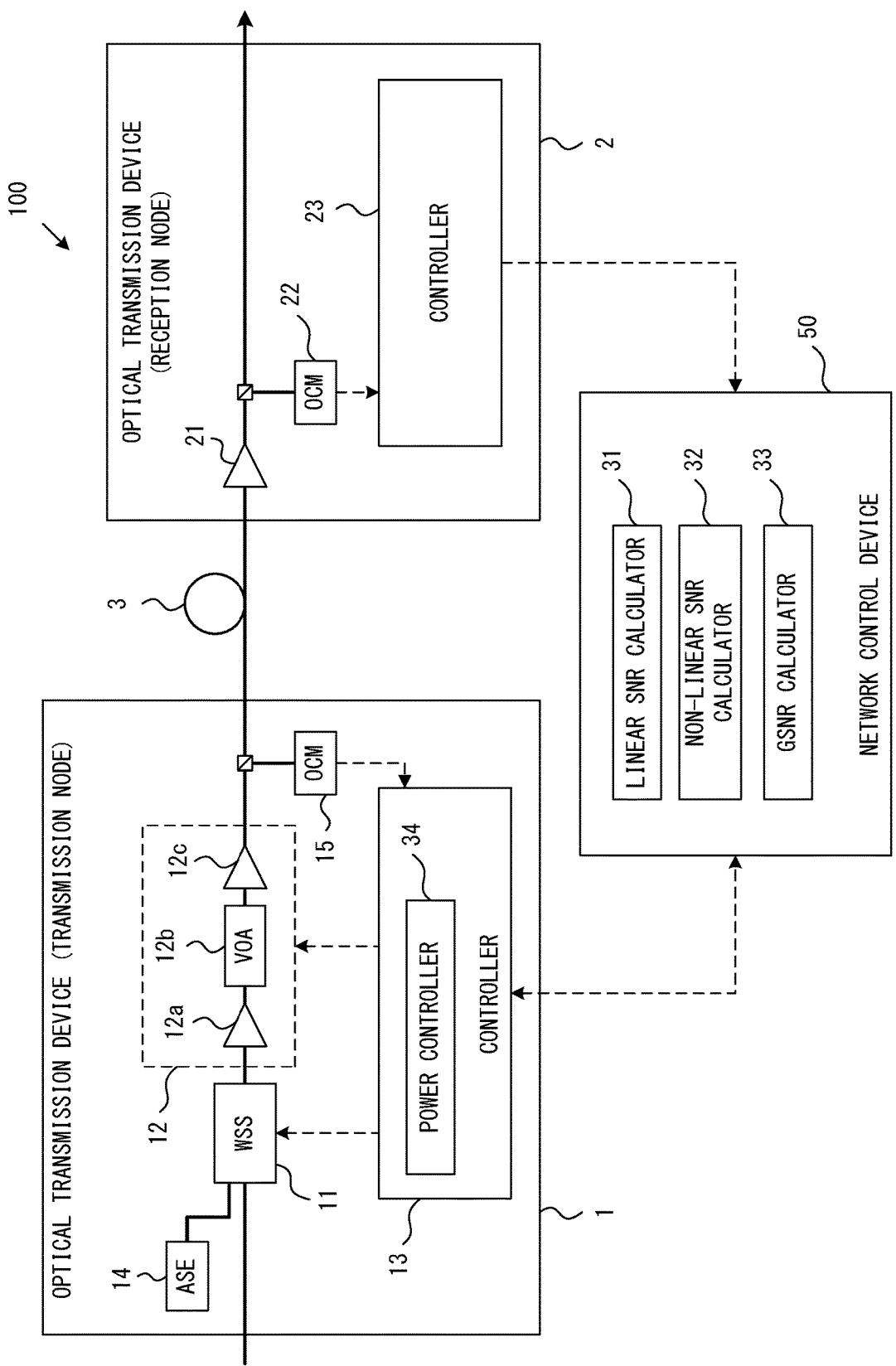
FIG. 9 illustrates a variation of the optical transmission system according to the first embodiment of the present invention.

FIG. 9 illustrates a variation of the optical transmission system according to the first embodiment of the present invention. The optical transmission system 100 illustrated in FIG. 9 includes a network control device 50. The network control device 50 can control each communication device in the optical transmission system 100. In addition, the network control device 50 is connected to the optical transmission devices 1 and 2. The network control device 50 includes a linear SNR calculator 31, a non-linear SNR calculator 32, and a GSNR calculator 33 illustrated in FIG. 4.

The optical transmission device 2 transmits spectrum information detected by the OCM 22 to the network control device 50. This spectrum information indicates the spectrum of the WDM signal received by the optical transmission device 2. Then, the linear SNR calculator 31 provided in the network control device 50 calculates a linear SNR of each wavelength channel based on the spectrum information received from the optical transmission device 2.

The optical transmission device 1 transmits the spectrum information detected by the OCM 15 to the network control device 50. This spectrum information indicates the spectrum of the WDM signal input from the optical transmission device 1 to the optical fiber transmission line 3. Then, the non-linear SNR calculator 32 provided in the network control device 50 calculates a non-linear SNR of each wavelength channel based on the spectrum information received from the optical transmission device 1.

The GSNR calculator 33 provided in the network control device 50 calculates the GSNR of each wavelength channel based on the linear SNR and the non-linear SNR. Furthermore, the network control device 50 generates control information for controlling the WSS 11 and the optical amplifier circuit 12 of the optical transmission device 1 based on the GSNR of each wavelength channel. Then, the network control device 50 transmits the control information to the optical transmission device 1. In the optical transmission device 1, the power controller 34 controls the WSS 11 and the optical amplifier circuit 12 in accordance with the control information received from the network control device 50. As a result, as illustrated in FIG. 2B, variations in the GSNR of each wavelength channel are suppressed. Note that, according to the configuration illustrated in FIG. 9, the loads on the optical transmission devices 1 and 2 can be reduced.

The linear SNR calculator 31, the non-linear SNR calculator 32, the GSNR calculator 33, and the power controller 34 are implemented by, for example, a computer including a processor and a memory. In this case, the processor executes the program stored in the memory to provide the functions of the linear SNR calculator 31, the non-linear SNR calculator 32, the GSNR calculator 33, and the power controller 34.

In the configuration illustrated in FIG. 4, the function of the linear SNR calculator 31 is provided by the processor implemented in the optical transmission device 2, and the functions of the non-linear SNR calculator 32, the GSNR calculator 33, and the power controller 34 are provided by the processor implemented in the optical transmission device 1. Furthermore, in the configuration illustrated in FIG. 9, the functions of the linear SNR calculator 31, the non-linear SNR calculator 32, and the GSNR calculator 33 are provided by a processor implemented in the network control device 50, and the function of the power controller 34 is provided by a processor implemented in the optical transmission device 1.

Second Embodiment

The power of light propagating through the optical fiber depends on the propagation distance. That is, as the distance from the transmission node increases, the optical power gradually decreases. However, an unintended loss that does not depend on the characteristics of the optical fiber may occur on the optical fiber transmission line. For example, a bending loss, a connection loss, a coupling loss, and the like may occur. In a case where such an unintended loss occurs, the error of the GSNR calculated by the above-described method increases. Therefore, in the second embodiment, a procedure for suppressing this error is provided. In the following description, an unintended loss generated on the optical fiber transmission line may be referred to as a "ramp loss".

Figure 10:
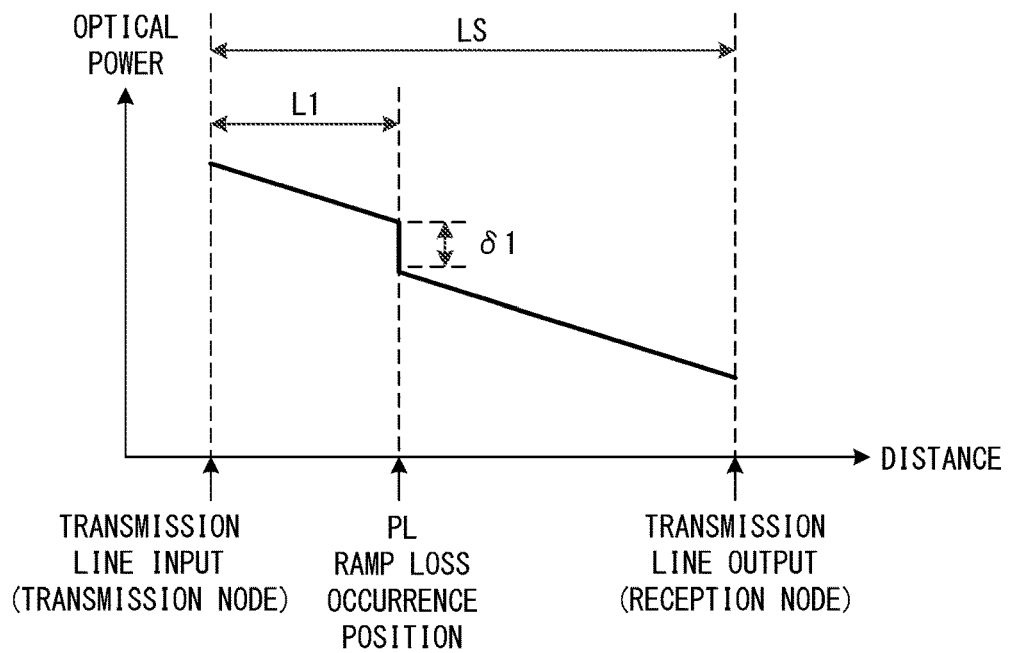
FIG. 10 illustrates an example of an optical power profile of an optical fiber transmission line in which a ramp loss occurs.

FIG. 10 illustrates an example of an optical power profile of an optical fiber transmission line in which a ramp loss occurs. In this example, the length (that is, a span length) of the optical fiber transmission line is LS, and a ramp loss occurs at a position PL separated from the transmission node by a distance L1.

In this case, when light propagates from the transmission node toward the position PL, the optical power gradually decreases. At the position PL, the optical power decreases by S1 due to the ramp loss. Furthermore, when light propagates from the position PL toward the reception node, the optical power further decreases.

Here, in the case where the ramp loss occurs, the power of the light reaching the reception node is lower than that in the case where there is no ramp loss. Specifically, in the case where the ramp loss occurs, the optical power is lower between the position PL and the reception node as compared with the case where there is no ramp loss. Therefore, it is preferable to correct the coefficient ηd used in Formula (4) or Formula (5) when calculating the non-linear SNR. For example, the coefficient Td is corrected by Formula (10).

$$\eta'd = \eta d \cdot f3(\alpha) \cdot f4(\delta1, L1, LS) \quad (10)$$

"α" represents a fiber loss coefficient (that is, loss per unit length) of the optical fiber transmission line 3. The function f3 generates a value depending on the fiber loss coefficient α. For example, the function f3 may be achieved by a calculation formula in which the larger the fiber loss coefficient α, the smaller the calculation result. In addition, the function f4 generates a value depending on the ramp loss δ1, the distance L1 from the transmission node to the ramp loss occurrence position PL, and the span length LS. For example, the function f4 may be achieved by a calculation formula in which the larger the ramp loss δ1, the smaller the calculation result, and the larger the distance (that is, "LS-L1") from the ramp loss occurrence position PL to the reception node, the smaller the calculation result.

When a ramp loss occurs at a plurality of positions on the optical fiber transmission line, the coefficient rd is corrected by Formula (11).

$$\eta'd = \eta d \cdot f3(\alpha) \cdot f4(\delta1, L1, LS) \cdot f4(\delta2, L2, LS) \quad (11)$$

The fiber loss coefficient, the occurrence position of the ramp loss, and the level of the ramp loss can be detected using, for example, an optical time domain reflectometer (OTDR). The OTDR is an optical measuring device that detects a discontinuous point of an optical fiber. Specifically, the OTDR enters an optical pulse into an optical fiber and detects reflected light from the optical fiber. Then, the OTDR can detect an optical power profile of the optical fiber (including information indicating a position of a discontinuous point of the optical fiber) based on the power and timing of the reflected light. The discontinuous point of the optical fiber includes a breaking point and an end point. The discontinuous point of the optical fiber also includes a connection point between the optical fibers. Therefore, the OTDR can detect the fiber loss coefficient, the occurrence position of the ramp loss, and the level of the ramp loss.

Figure 11:
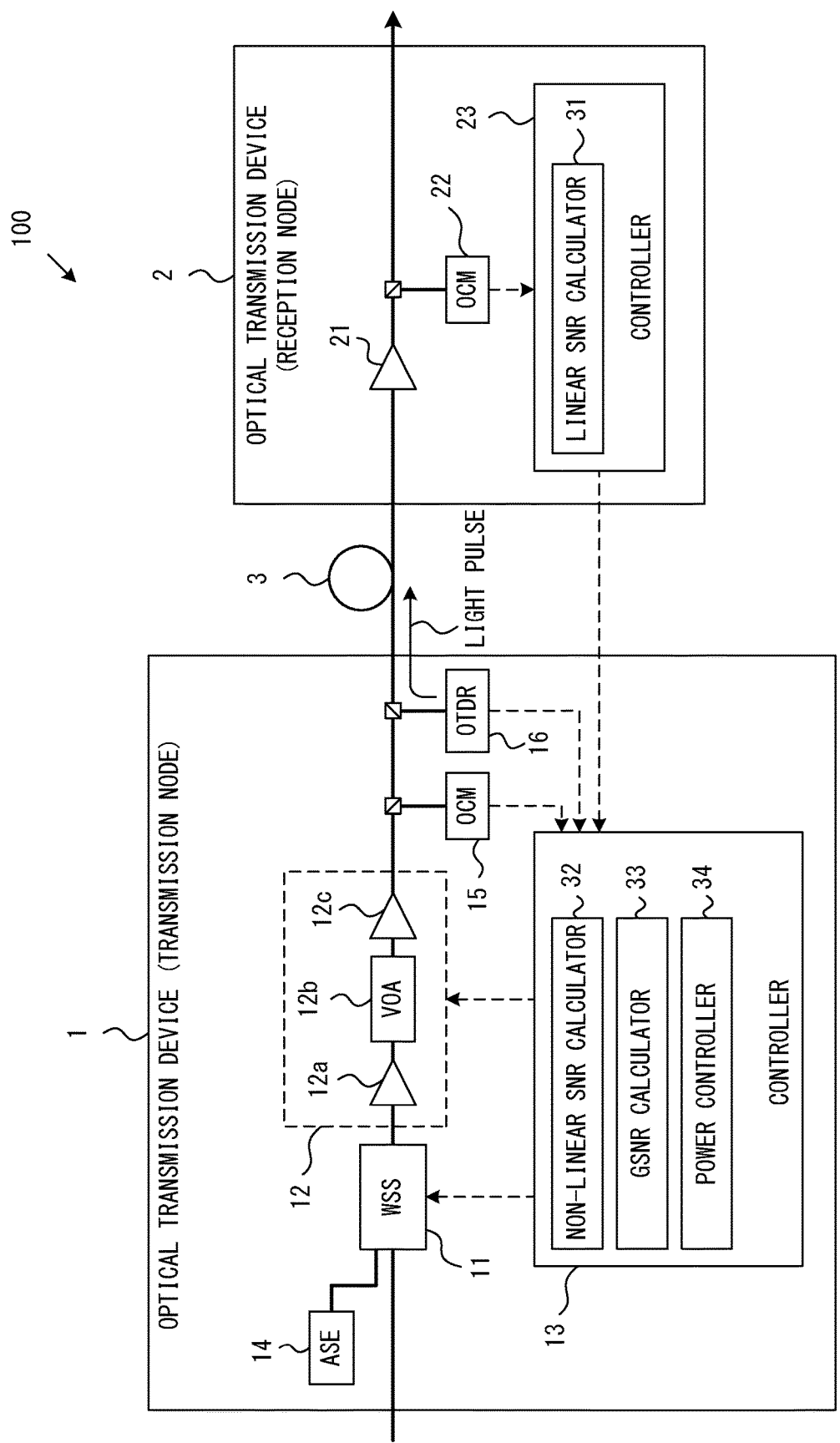
FIG. 11 illustrates an example of an optical transmission system according to a second embodiment of the present invention.

FIG. 11 illustrates an example of an optical transmission system according to the second embodiment of the present invention. In the second embodiment, the optical transmission device 1 includes an OTDR 16 in addition to the WSS 11, the optical amplifier circuit 12, the controller 13, the ASE light source 14, and the OCM 15. The OTDR 16 detects a state of the optical fiber transmission line 3 connecting the optical transmission device 1 and the optical transmission device 2. That is, the OTDR 16 can create an optical power profile of the optical fiber transmission line 3 by inputting an optical pulse to the optical fiber transmission line 3 and detecting the reflected pulse.

The controller 13 detects the fiber loss coefficient, the occurrence position of the ramp loss, and the level of the ramp loss based on the optical power profile created by the OTDR 16. Here, the span length LS (that is, the distance between the optical transmission devices 1 and 2) is known. Therefore, the controller 13 can correct the coefficient ηd for calculating the non-linear SNR using Formula (11).

In the example illustrated in FIG. 11, the state of the optical fiber transmission line 3 is detected using an OTDR provided in a transmission node. However, the state of the optical fiber transmission line 3 may be detected using an OTDR provided in a reception node. In this case, the optical transmission device 2 transmits information obtained by the OTDR to the optical transmission device 1.

Figure 12A:
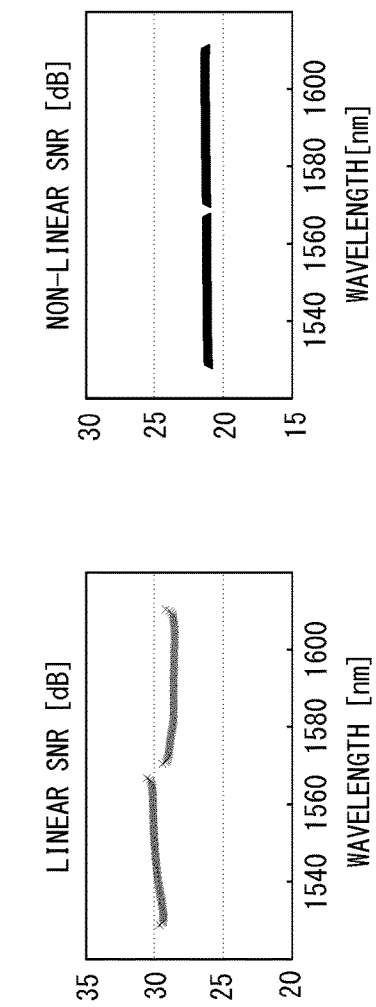
FIGS. 12A-12C illustrate an example of a simulation regarding an influence of a ramp loss on a GSNR.
Figure 12B:
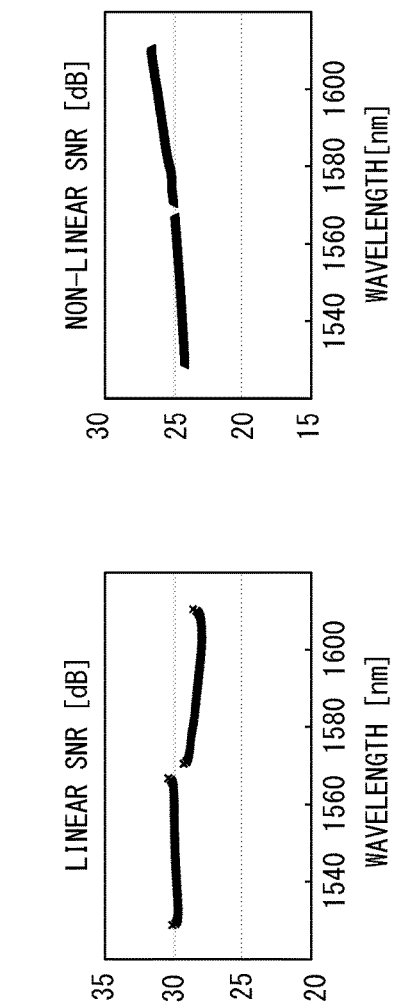
Figure 12C:
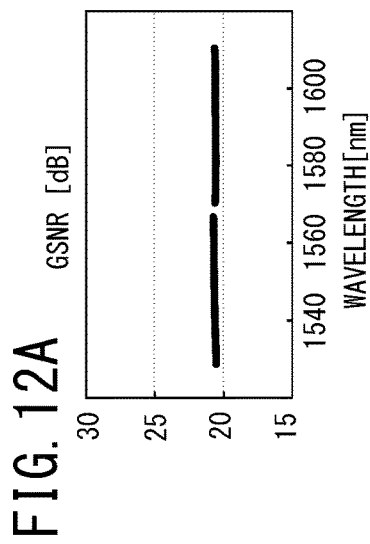
Figure 12C:
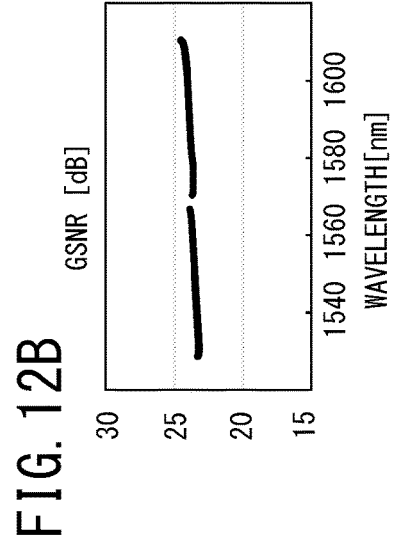
Figure 12C:
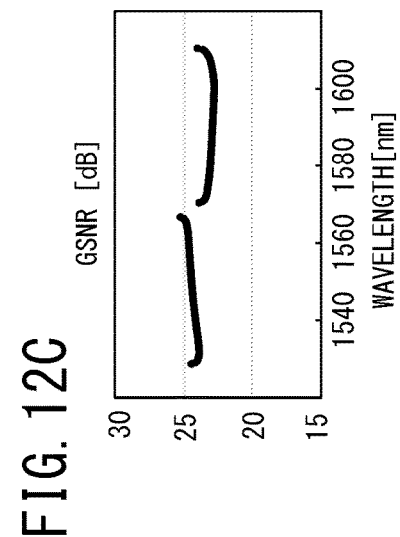

FIGS. 12A-12C illustrate an example of a simulation regarding an influence of a ramp loss on a GSNR. FIG. 12A illustrates a case where parameters are set in advance on the assumption that there is no ramp loss of the optical fiber. That is, the wavelength characteristic of the linear SNR and the wavelength characteristic of the non-linear SNR are configured by pre-design so that the GSNR is flat with respect to the wavelength.

However, in a case where the transmission power control is performed based on the pre-design, when the ramp loss occurs, the power of the light decreases in the optical fiber transmission line, so that the SRS decreases. That is, the transition of the optical power from the short wavelength region to the long wavelength region is reduced. As a result, as compared with the pre-design, the optical power in the long wavelength region decreases, and as illustrated in FIG. 12B, the linear SNR in the long wavelength region deteriorates. In addition, since the power of light propagating through the optical fiber transmission line decreases due to the ramp loss, the non-linear SNR becomes high as a whole. Since the SRS decreases, the tendency is remarkable in the long wavelength region, but as a result, the balance between the wavelength characteristic of the linear SNR and the wavelength characteristic of the non-linear SNR is lost, and the GSNR is not flat with respect to the wavelength. In the example illustrated in FIG. 12B, the GSNR in the short wavelength region is relatively decreased. Note that, in a case where the ramp loss occurs, the contribution of the wavelength characteristic of the non-linear SNR to the wavelength characteristic of the GSNR becomes relatively small. However, as illustrated in FIG. 12C, even if the wavelength characteristic of the linear SNR is made flat, the wavelength characteristic of the GSNR does not necessarily become flat.

Therefore, in the embodiment of the present invention, the WSS 11 and the optical amplifier circuit 12 are feedback-controlled so that the GSNR is flat with respect to the wavelength. In addition, in the second embodiment, the coefficient rid for calculating the non-linear SNR is corrected in consideration of the ramp loss.

Figure 13:
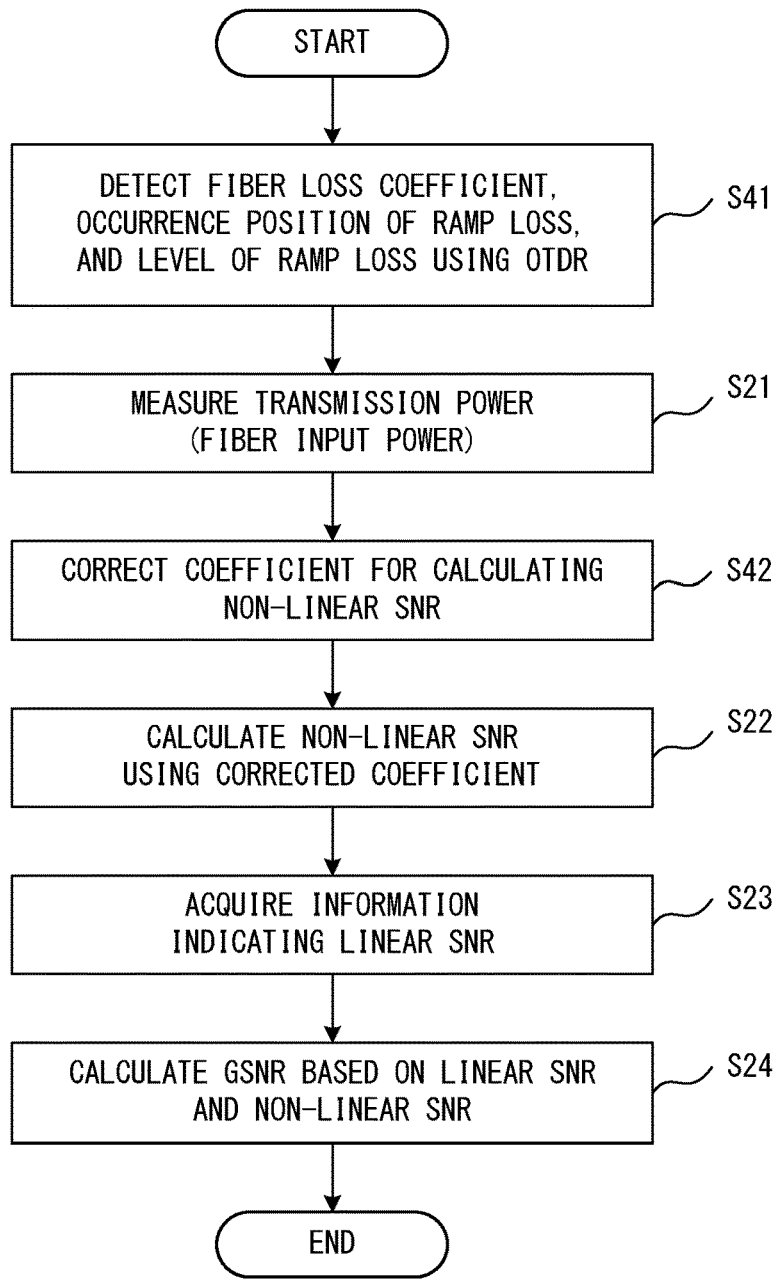
FIG. 13 is a flowchart illustrating an example of a process for calculating a GSNR in the second embodiment.

FIG. 13 is a flowchart illustrating an example of a process for calculating a GSNR in the second embodiment. In the second embodiment, the processes of S41 and S42 are executed in addition to the procedure illustrated in FIG. 7.

In S41, the controller 13 detects the state of the optical fiber transmission line 3 using the OTDR 16. Then, the non-linear SNR calculator 32 detects the fiber loss coefficient of the optical fiber transmission line 3, the occurrence position of the ramp loss, and the level of the ramp loss based on the information obtained by the OTDR 16.

The controller 13 calculates the non-linear SNR and the GSNR in a similar procedure to S21 to S24 illustrated in FIG. 7. However, in the second embodiment, the non-linear SNR calculator 32 corrects the coefficient ηd for calculating the non-linear SNR in S42. At this time, the coefficient ηd is corrected based on the fiber loss coefficient, the occurrence position of the ramp loss, and the magnitude of the ramp loss obtained in S41. Then, the non-linear SNR calculator 32 calculates the non-linear SNR using the corrected coefficient ηd. Thereafter, the GSNR calculator 33 calculates the GSNR.

Figure 14:
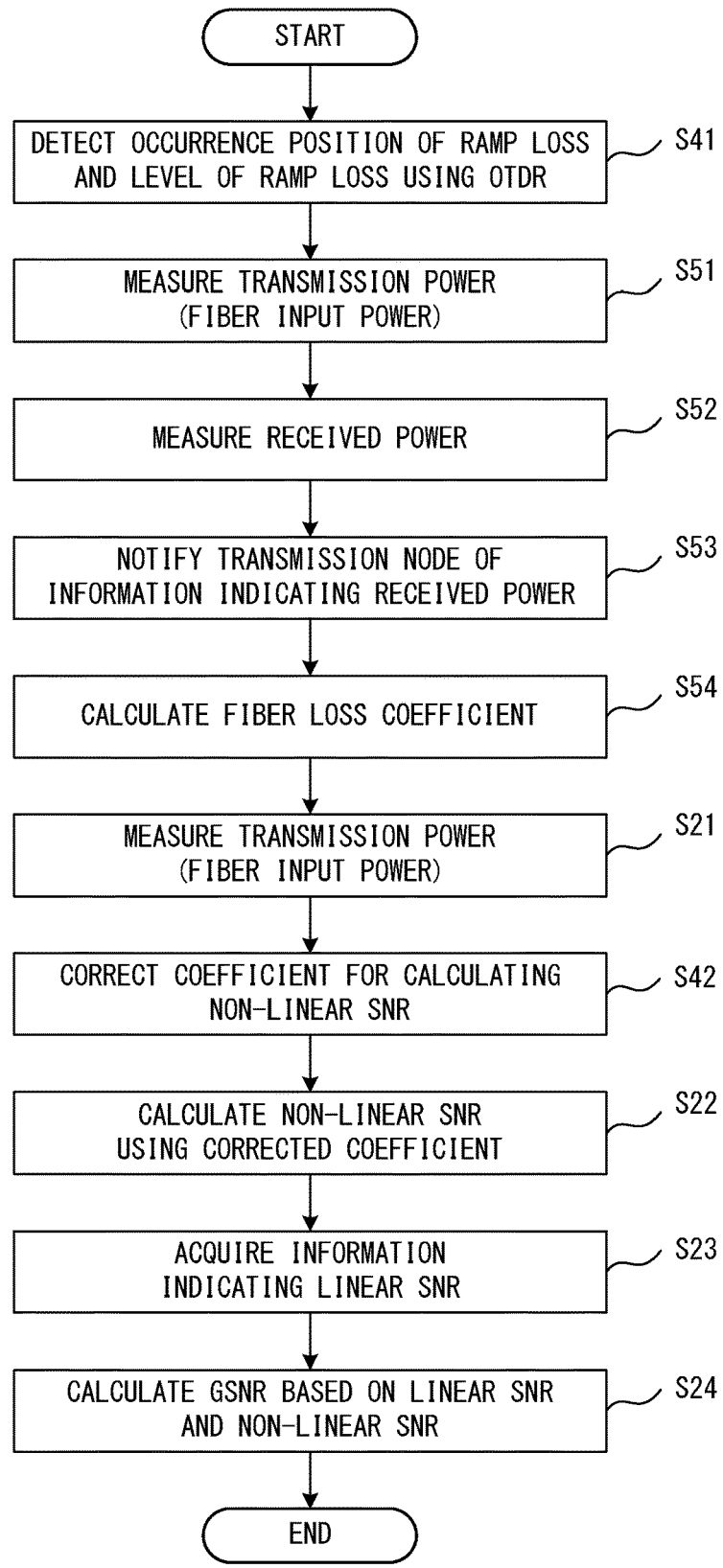
FIG. 14 is a flowchart illustrating a variation of a process for calculating a GSNR in the second embodiment.

FIG. 14 is a flowchart illustrating a variation of a process for calculating a GSNR in the second embodiment. In the procedure illustrated in FIG. 13, the fiber loss coefficient α of the optical fiber transmission line 3 is detected using the OTDR 16. On the other hand, in the variation illustrated in FIG. 14, the fiber loss coefficient of the optical fiber transmission line 3 is detected by another method. In S41, the controller 13 does not need to detect the fiber loss coefficient of the optical fiber transmission line 3 using the OTDR 16.

The optical transmission device 1 generates a WDM signal and transmits the WDM signal to the optical transmission device 2. At this time, the controller 13 may generate the WDM signal using the ASE light source 14 and the WSS 11.

In S51, the OCM 15 of the transmission node (that is, optical transmission device 1) measures optical transmitting power of each wavelength channel of the WDM signal. That is, the fiber input power of each wavelength channel is measured. In S52, the OCM 22 of the reception node (that is, optical transmission device 2) measures the received optical power of each wavelength channel of the WDM signal. In S53, the controller 23 transmits information indicating the received optical power of each wavelength channel to the optical transmission device 1. In S54, the controller 13 calculates a fiber loss coefficient for each wavelength channel based on the optical transmitting power measured in S51 and the received optical power measured in S52. In this case, the fiber loss coefficient for the wavelength channel i is expressed by Formula (12). In the procedure illustrated in FIG. 14, the same measurement is performed in S51 and S21, but this is for updating the measured value in a case where there is a temporal change, and the measured value in S51 can be used as it is in a case where it is expected that there is no temporal change.

$$\alpha\_CH(i)=(P\_CH(T)(i)-P\_CH(R)(i)-\delta)/LS \quad (12)$$

P_CH(T) (i) represents optical transmitting power of the wavelength channel i. P_CH(R) (i) represents received optical power of the wavelength channel i. δ represents the level of the ramp loss detected by the OTDR. When there are a plurality of ramp losses on the optical fiber transmission line, δ represents the sum of the ramp losses. LS represents a span length. Thereafter, the GSNR is calculated by executing S21 to S24.

Figure 15:
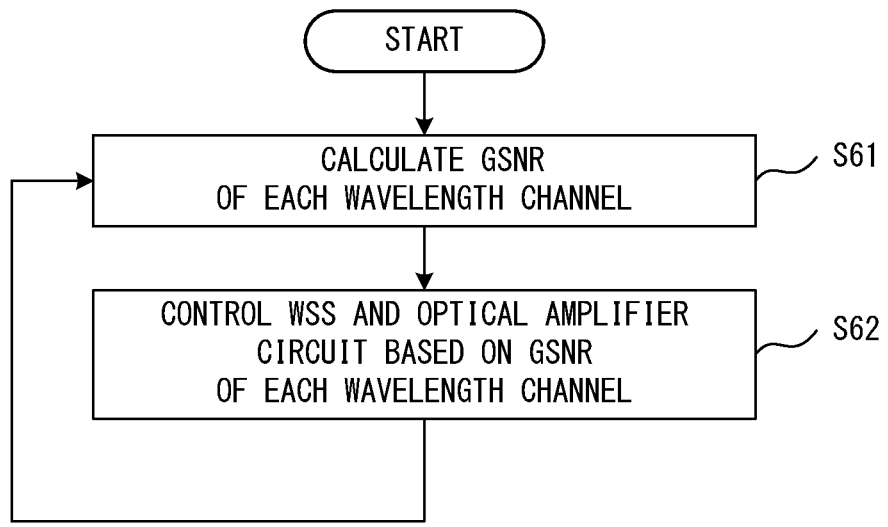
FIG. 15 is a flowchart illustrating an example of optical transmitting power control.

FIG. 15 is a flowchart illustrating an example of optical transmitting power control. The processing of this flowchart is repeatedly executed at a specified cycle.

In S61, the controller 13 of the transmission node calculates a GSNR of each wavelength channel. At this time, the controller 13 calculates the GSNR of each wavelength channel in cooperation with the controller 23 of the reception node. Specifically, the GSNR is calculated by, for example, the procedure illustrated in FIG. 7, FIG. 13, or FIG. 14.

In 562, the controller 13 controls the WSS 11 and the optical amplifier circuit 12 based on the GSNR of each wavelength channel. At this time, for example, the controller 13 controls the attenuation amount of each wavelength channel in the WSS 11 and the gain of the optical amplifier circuit 12 so as to reduce the variation in the GSNR of each wavelength channel.

By repeatedly executing the procedure illustrated in FIG. 15 at a specified cycle, the variation in the GSNR of each wavelength channel with respect to the wavelength is reduced, and the minimum GSNR of the WDM signal is stabilized. Therefore, stable WDM transmission is achieved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmission system that transmits a WDM (wavelength division multiplexed) signal from a first optical transmission device to a second optical transmission device via an optical fiber transmission line, the optical transmission system comprising:
   a first optical channel monitor that detects optical power of each wavelength channel of the WDM signal in the first optical transmission device;
   a second optical channel monitor that detects optical power of each wavelength channel of the WDM signal in the second optical transmission device;
   a first processor that calculates a linear SNR (signal-to-noise ratio) of each wavelength channel of the WDM signal based on the optical power of each wavelength channel detected by the second optical channel monitor;
   a second processor that calculates a non-linear SNR of each wavelength channel of the WDM signal based on the optical power of each wavelength channel detected by the first optical channel monitor;

a third processor that calculates a GSNR (generalized SNR) for each wavelength channel of the WDM signal using the linear SNR calculated by the first processor and the non-linear SNR calculated by the second processor; and a fourth processor that controls transmission power of each wavelength channel of the WDM signal transmitted from the first optical transmission device based on the GSNR of each wavelength channel calculated by the third processor.

2. The optical transmission system according to claim 1, wherein
the fourth processor controls transmission power of each wavelength channel of the WDM signal transmitted from the first optical transmission device so as to reduce variations in the GSNR of each wavelength channel calculated by the third processor.

3. The optical transmission system according to claim 1, wherein
the first optical transmission device includes:
an optical circuit that controls optical power of each wavelength channel of the WDM signal in accordance with an instruction given from the fourth processor; and
an optical amplifier circuit that controls optical power of the WDM signal in accordance with an instruction given from the fourth processor.

4. The optical transmission system according to claim 1, wherein
the second processor calculates a non-linear noise by multiplying a cube of the optical power detected by the first optical channel monitor by a specified proportionality coefficient for each wavelength channel, and calculates the non-linear SNR by calculating a ratio between the optical power detected by the first optical channel monitor and the non-linear noise.

5. The optical transmission system according to claim 4, wherein
the second processor corrects the proportionality coefficient based on a fiber loss coefficient of the optical fiber transmission line, an occurrence position of a ramp loss, and a level of the ramp loss.

6. An optical transmission device that transmits a WDM (wavelength division multiplexed) signal to a reception node via an optical fiber transmission line, the optical transmission device comprising:
an optical channel monitor that detects transmission power of each wavelength channel of the WDM signal; and
a processor that
acquires information indicating a linear SNR (signal-to-noise ratio) of each wavelength channel of the WDM signal, the linear SNR being calculated based on received optical power of each wavelength channel of the WDM signal detected at the reception node,
calculates a non-linear SNR of each wavelength channel of the WDM signal based on optical power of each wavelength channel detected by the optical channel monitor,
calculates a GSNR (generalized SNR) of each wavelength channel of the WDM signal using the linear SNR and the non-linear SNR, and
controls the transmission power of each wavelength channel of the WDM signal based on the GSNR of each wavelength channel.

7. The optical transmission device according to claim 6, wherein
the linear SNR of each wavelength channel of the WDM signal is calculated at the reception node, and
the processor acquires the information indicating the linear SNR of each wavelength channel of the WDM signal from the reception node.

8. The optical transmission device according to claim 6, wherein
the linear SNR of each wavelength channel of the WDM signal is calculated in a network control device connected to the optical transmission device and the reception node, and
the processor acquires the information indicating the linear SNR of each wavelength channel of the WDM signal from the network control device.

9. A method for controlling optical transmitting power of each wavelength channel of a WDM (wavelength division multiplexed) signal in an optical transmission system that transmits the WDM signal from a first optical transmission device to a second optical transmission device via an optical fiber transmission line, the method comprising:
detecting optical transmitting power of each wavelength channel of the WDM signal by using a first optical channel monitor in the first optical transmission device;
detecting received optical power of each wavelength channel of the WDM signal by using a second optical channel monitor in the second optical transmission device;
calculating a linear SNR (signal-to-noise ratio) of each wavelength channel of the WDM signal based on the received optical power of each wavelength channel detected by the second optical channel monitor;
calculating a non-linear SNR of each wavelength channel of the WDM signal based on the optical transmitting power of each wavelength channel detected by the first optical channel monitor;
calculating a GSNR (generalized SNR) of each wavelength channel of the WDM signal using the linear SNR and the non-linear SNR; and
controlling the optical transmitting power of each wavelength channel of the WDM signal based on the GSNR of each wavelength channel in the first optical transmission device.

* * * * *